INVENTOR
PIERRE MARCEL BOURDON
BY
HIS ATTORNEYS

United States Patent Office 2,894,555
Patented July 14, 1959

2,894,555

PNEUMATIC TIRE CASINGS

Pierre Marcel Bourdon, Paris, France, assignor to Compagnie Generale des Etablissements Michelin (Robert Puiseux & Cie), Clermont-Ferrand, France Application February 17, 1955, Serial No. 488,946

Claims priority, application France September 29, 1954

1 Claim. (Cl. 152—361)

This invention relates to improvements in pneumatic tire casings and it relates more particularly to an improved arrangement of the plies in such pneumatic tire casings to control more readily the flexibility of the tire without loss of strength in the tread portion of the casing.

Pneumatic tire casings comprise a tread portion having a ground-engaging tread surface, flexible side wall portions and bead portions which engage the rim of the wheel of a vehicle. The side wall and tread portions are reinforced by a carcass constituted by one or more plies of fabric which extend from one bead portion of the casing to the other and are folded around the bead wires therein. These plies consist usually of a fabric made up of parallel cords embedded in rubber. The cords may be formed of natural fibers, such as cotton, synthetic fibers, such as "rayon" or "nylon," or solid, braided or twisted metallic wires. In the description of the invention and in the claims the term "cords" will be used to designate threads consisting of natural or synthetic fibers, glass threads, metal threads, or bundles of any of the aforementioned types of threads or fibers, twisted or braided together. Conventional tire casings also usually include one or more breaker plies or strips of the same or different kind of fabric which are interposed between the ground-engaging surface of the tread portion and the ply or plies of the carcass and usually are substantially coextensive with the tread portion of the tire.

The present invention relates to an improved arrangement of the plies in a pneumatic tire casing enabling the flexibility of the tire and the strength of the tread portion to be controlled more readily thereby to improve the durability and riding characteristics of the tire casing and to render the manufacture of the tire more easy and cheaper. The invention enables the strength of the tread portion of the casing to be increased without increasing the number of breaker strips or plies. Moreover, the invention enables the number of reinforcement strips in the tread portion to be reduced without weaking the tire appreciably.

In every case the tire is more flexible than a tire having the same total number of plies (including reinforcement strips and carcass plies) in the tread portion, but with continuous carcass ply (or plies) as usual.

More particularly, according to the invention, the carcass of the improved tire comprises meridian side wall plies (i.e. plies made of cords lying in planes extending radially of and passing through the axis of rotation of the wheel) which extend from the bead portions of the tire past the median or equatorial plane of the tire but do not extend appreciably into the opposite side wall portion of the casing. Thus, the side wall plies are overlapped only in an area not substantially exceeding the width of the tread portion of the tire casing. In this way, by way of example, single plies consisting of parallel cords in each side wall are overlapped to provide a double ply reinforcement in the tread portion of the tire casing. Due to the doubling effect of overlapping the plies, it will be evident that (1) fewer side wall plies may be used with the reinforcement tread plies to provide a strong tread portion and highly flexible side walls, (2) the customary number of side wall plies may be used with fewer than the normal number of reinforcement tread plies in the casing without weakening the tread portion of the tire, or (3) any usual number of side wall plies may be used together with any usual number of reinforcement tread plies to produce a stronger than usual tread portion.

Moreover in every case, owing to the fact that the single carcass ply or the whole of the carcass plies are discontinuous, the tire is rendered more flexible.

For a better understanding of the present invention, reference may be had to the accompanying drawings in which.

Figure 1:
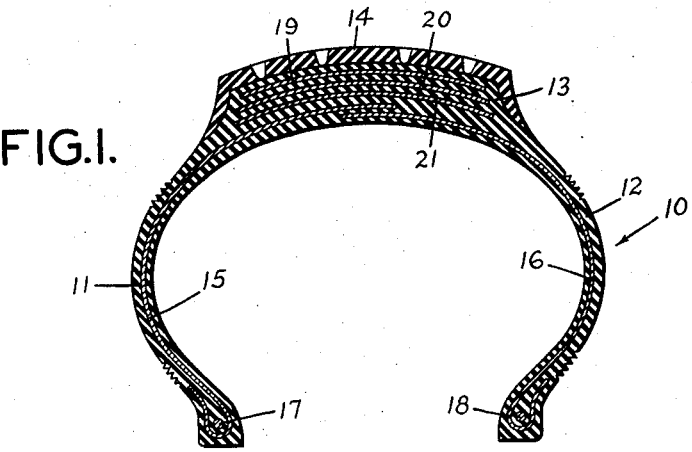
Fig. 1 is a view in cross section through one side of a tire casing embodying one form of the present invention.

By way of an example of the present invention, Fig. 1 discloses a section of a tire casing 10 that includes side wall portions 11 and 12 and a tread portion 13 provided with a patterned ground-contacting tread band 14. The tread band 14 may be made of more abrasion-resistant rubber than the rubber used in the remainder of the tire casing 10. The tire casing 10 is reinforced by means of plies 15 and 16 consisting of parallel cords which are wrapped around the bead wires or cables 17 and 18 in the tire casing and extend through the side walls 11 and 12 into an overlapping relation upon a short length (few centimeters) at about the median or equatorial plane of the tire. The casing 10 is further reinforced by means of a plurality of breaker plies or strips 19, 20 and 21.

The plies 19, 20 and 21, preferably are of the kind and are arranged in the manner disclosed in my Patent No. 2,493,614, dated January 3, 1950. Thus, for example, the plies 19, 20 and 21 may contain parallel cords formed of metallic wires, or twisted or braided wires. The cords in each ply are parallel with each other and the plies are so arranged that the cords of the several plies are disposed in a triangulated relation to reinforce the tread against peripheral stresses during operation of the tire. The cords in the plies are bonded together within and by the rubber in the tire casing.

The novel feature of the above-described tire is the provision of separate plies 15 and 16 in the side walls of the casing disposed so that they overlap more or less each other within the tread portion 13 of the tire casing 10 and do not extend from bead to bead. The plies are arranged so that they overlap to form a multiple-ply zone that is essentially symmetrical with respect to the equatorial plane of the casing. By this arrangement, single plies in the side walls 11 and 12 produce a two-ply reinforcement at the center of the tread portion of the tire.

It has been found that the discontinuity of the plies 15 and 16 does not weaken the tire casing because the plies are bonded strongly together by the rubber impregnating and joining them and by being bonded strongly to the plies 19 to 21 which overlap the plies 15 and 16. Thus, separation or expansion of the tire because of the discontinuity of the plies is not possible and, in fact, the tire is strengthened against the stresses and shocks because of the multi-ply effect obtained by means of the overlapped plies.

Moreover owing to the fact that the plies 15 and 16 do not constitute a continuous carcass, the flexibility of the tire is increased without weakening the strength of the tread portion.

While only one ply is illustrated as being present in each side wall of the casing 10, it will be understood that a plurality of plies may be provided in each side wall with the inner ends of these plies in overlapping relation to reinforce the center portion of the tread. If desired, the advantages of a plurality of plies may be obtained by extending the portion of the plies 15, 16 which loop around the beads 17, 18 upwardly into the tread portion of the casing in overlapping relationship with the ends of similar plies in the other side wall portion of the tire casing.

Even stronger reinforcement can be obtained by increasing the amount of overlap of the plies. Thus, in the tire casing 22 disclosed in Fig. 2, the side wall plies 23 and 24 may be overlapped substantially the entire width of the tread portion 25 of the tire casing or even more. In other words, the overlap is substantially coextensive with the width of the reinforcement plies 26 in the tire casing so that five layers of ply in the tread portion are obtained with only three reinforcement plies and single plies in the side walls of the tire casing.

Figure 3:
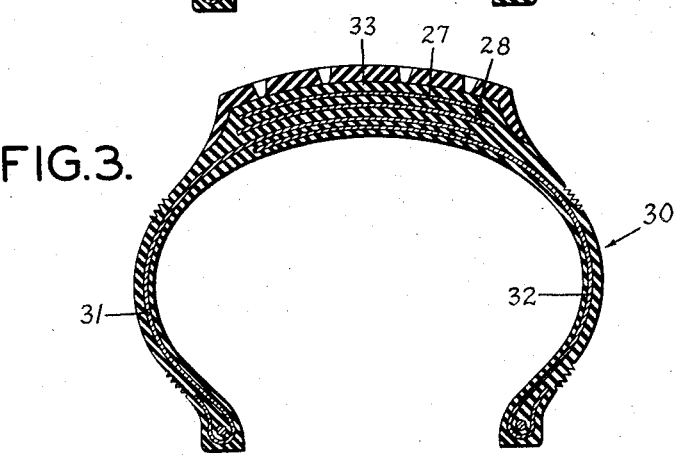
Fig. 3 is a view in section taken through a tire casing embodying another form of the invention.

The increased number of plies in the tread portion of a tire casing provided by overlapping the plies 23 and 24 enables the number of reinforcement plies in the tread portion of the tire to be reduced, if desired, without impairing the strength of the tread portion. As shown in Fig. 3, only two reinforcement plies 27 and 28 are used in a tire casing 30 which has single side wall plies 31 and 32. Nevertheless, the tread portion 33 of the tire casing is reinforced by four plies due to the overlapping relation of the plies 31 and 32 in the tread portion of the casing.

As indicated above, the arrangement of the cords in the ply fabric and the arrangement of the plies in the tire casing are susceptible to considerable modification. For example, the plies 27, 28, 31 and 32 in Fig. 3 may consist of metallic threads or bundles thereof and can be arranged so that the reinforcing cords of the plies form in the tread portion a triangulated structure as disclosed in my Patent No. 2,493,614, January 3, 1950, or in my application Serial No. 239,238, filed July 30, 1951, now abandoned, or in my application Serial No. 140,823, filed January 27, 1950, now Patent No. 2,811,998, November 5, 1957. The plies 27 and 28 may be embedded in, and bonded together by means of, a layer of harder rubber than that used normally in the side walls or tread of a tire to reinforce them against distorsional stresses and against scissor movements of the cords.

Figure 2:
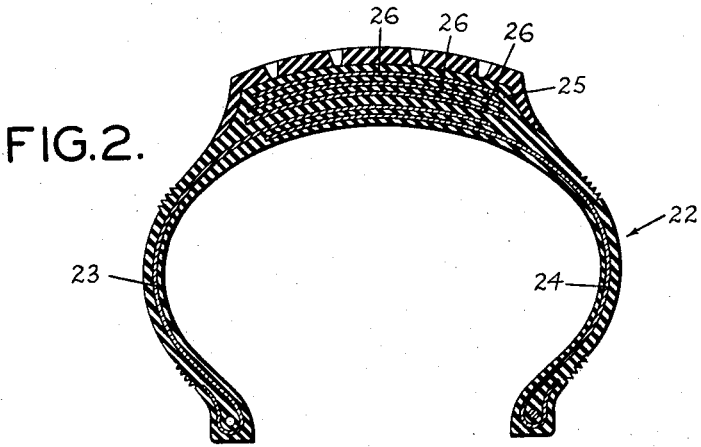
Fig. 2 is a view in section taken through one side of a tire casing showing a modified form of the invention.

As indicated above, the tire casings disclosed in Figs. 1 to 3, may be provided in each side wall portion with a plurality of fabric plies overlapping each other in the tread portion and the number of reinforcement plies of said tread portion may be decreased proportionately, if desired.

From the preceding description of typical embodiments of the invention, it will be apparent that the new tire casings are susceptible to considerable variation, without departing from the spirit of the invention and, accordingly, the examples of tire casings disclosed herein should not be considered as limiting the scope of the following claim.

I claim:

A tire casing comprising a pair of wheel engaging beads having bead wires therein, a tread portion disposed outwardly of said beads, sidewalls extending from the edges of the tread portion to said beads, each sidewall consisting of at least one fabric ply, each fabric ply consisting of cords embedded in rubber and arranged closely and uniformly side by side in the corresponding ply, said cords being anchored at one end to a bead wire and extending radially outwardly from the bead into the tread portion, said cords extending beyond the center line of the tread portion and terminating within the tread portion and thereby overlapping within the tread portion in such a manner that the overlap is confined within the limits of the tread portion of the tire casing, and at least two separate superimposed layers of cords within said tread portion and substantially coextensive with said tread portion and substantially parallel to the ground-contacting surface of said tread portion, the cords in each layer being substantially parallel and the cords of each of two layers extending in different directions and being inclined to the side wall ply cords in said tread portion.

References Cited in the file of this patent

UNITED STATES PATENTS

| | | |
|---|---|---|
| 1,581,743 | Kearns et al. | Apr. 20, 1926 |
| 1,732,793 | Darrow | Oct. 22, 1929 |
| 1,918,553 | Musselman | July 18, 1933 |
| 2,310,776 | Gay | Feb. 9, 1943 |
| 2,493,614 | Bourdon | Jan. 3, 1950 |
| 2,703,128 | Darrow | Mar. 1, 1955 |
| 2,703,132 | Darrow | Mar. 1, 1955 |